Aug. 4, 1970   D. W. GORDON ET AL   3,522,686
METHOD OF FABRICATING PLASTIC STRUCTURES
Filed May 19, 1969   2 Sheets-Sheet 1

INVENTORS
DONALD W. GORDON
EDWIN AXEL

BY Karl L. Spivak
ATTORNEY

Aug. 4, 1970   D. W. GORDON ET AL   3,522,686
METHOD OF FABRICATING PLASTIC STRUCTURES
Filed May 19, 1969   2 Sheets-Sheet 2
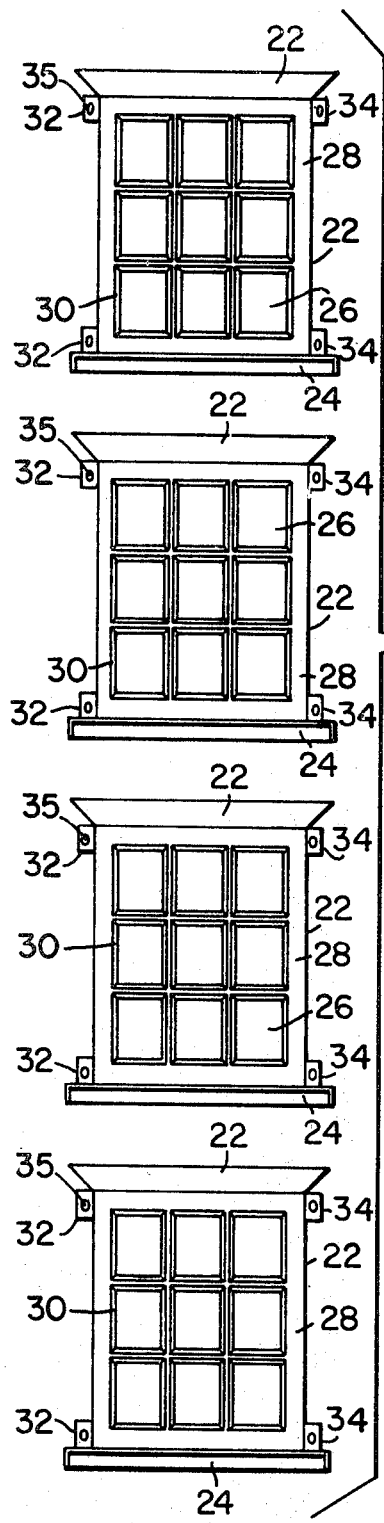
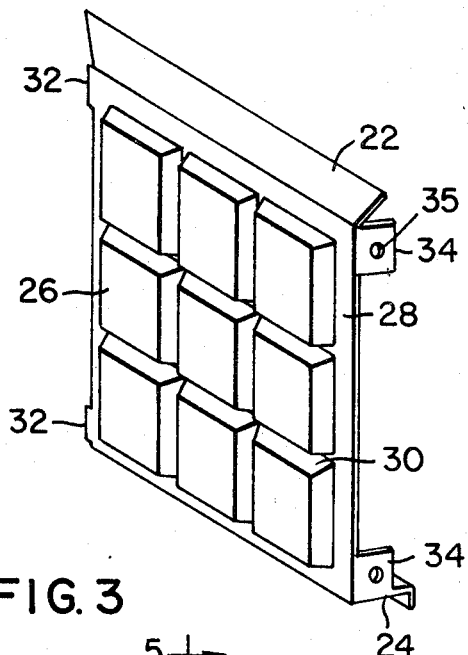
FIG. 2
FIG. 3
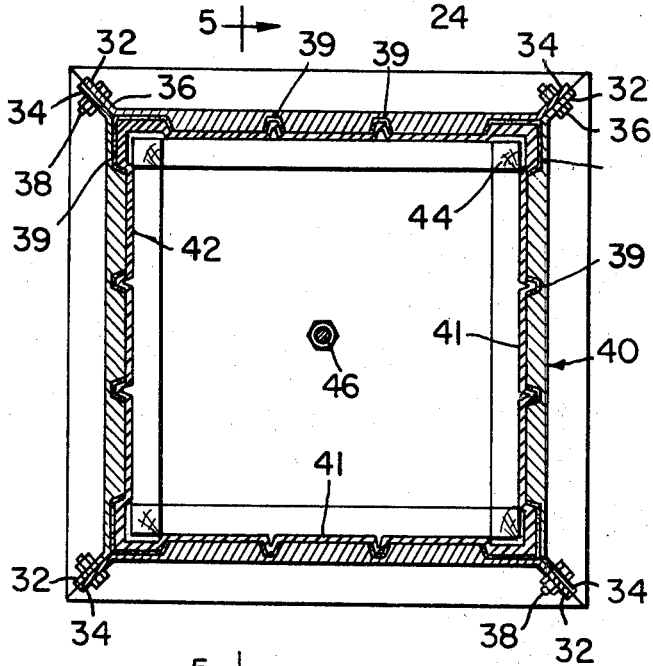
FIG. 4
INVENTORS
DONALD W. GORDON
EDWIN AXEL
BY Karl L. Spivak
ATTORNEY

United States Patent Office 3,522,686
Patented Aug. 4, 1970

---

3,522,686
METHOD OF FABRICATING PLASTIC STRUCTURES
Donald W. Gordon and Edwin Axel, Jenkintown, Pa., assignors to E Don Corporation, Jenkintown, Pa., a corporation of Pennsylvania
Filed May 19, 1969, Ser. No. 825,785
Int. Cl. B29c 5/02
U.S. Cl. 52—745       3 Claims

ABSTRACT OF THE DISCLOSURE

The method of fabricating a structure of plastic materials including the steps of preparing a multi-sided mold of desired configuration, assembling the mold sides in edge to edge juxtaposition to enclose the entire configuration of the finished structure, spraying selected, unmasked portions of the surfaces of the mold with a gel-coat material conforming to the color desired in the finished structure, drying the said gel-coat material for the required period, spraying the entire inside surface of the said mold with fiber glass or other plastic material to build up a thickness of plastic material, adding vertical and horizontal structural support members within the mold and embedded within the plastic material to supply rigidity and strength to the completed unit.

---

This invention relates generally to the building material field, and more particularly, is directed to the method of fabricating a structural unit of plastic materials for use in conjunction with building structures erected of conventional building materials.

The present invention teaches a method of molding building structural units such as a flower box or a cupola in a single unit or in one or more sections joined together which are especially designed and fabriced of fiber glass plastic material. The units are integrally molded and may include simulated windows of translucent panels, decorative moldings, flanges and copper colored cap sections. A method is herein disclosed whereby the various portions of the fiber glass structures may be colored to conform to associated building colors to thereby provide a maintenance free unit of any desired colored combination. The fiber glass units are structurally reinforced to provide utmost stability under all weather conditions and are completely water-tight to thereby eliminate all maintenance problems from the standpoints of water leakage, maintenance painting and possible damage from heavy wind storms. The present invention teaches a method of fabricating which is specifically designed to produce a building unit that is structurally sound and absolutely maintenance free.

The unit is normally made of a four or more piece mold when constructing a multi-sided configuration and may be vertically divided into three separate sections if so desired when considering structural or unique color division problems. The top cap section is usually separately formed because of the fact that normally, a copper color is applied to simulate an actual copper roofing material. The central section is usually constructed with a window area built into the mold to thereby simulate a usual window section by utilizing translucent panels shaped to the configuration of a window. The bottom section may be made also in a four or more piece mold wherein all desired lines, configurations, flanges, moldings and other decorative features may be formed directly therein.

Prior workers in the field have never before contemplated constructing a building section such as a cupola of molded fiber glass material so far as is known to the applicants. Prior art cupolas have usually been constructed of conventional building materials such as lumber, glass and roofing materials which are fabricated at the site using normal building methods. Such prior art cupolas simulate the appearance of authentic colonial construction when properly designed and would normally be suitable for the purpose intended if it were not always the case that the necessary hand labor and the use of conventional building materials results in a construction that is extremely costly to build. Additionally, because of the hand labor involved, present construction practices necessitate a rather lengthly construction period before completion of a cupola. By employing the present method, a prefabricated cupola may be delivered to the site in one or more sections for immediate installation at far less cost, having known authentic design and fabricated of materials which will eliminate future maintenance expenses.

It is therefore an object of the present invention to provide a method of fabricating a building unit of plastic materials that is far less costly than prior art constructions.

It is another object of the present invention to provide a method of fabricating a building unit of plastic materials that includes the use of molds formed to a desired configuration and the application thereon of sprayed plastic materials.

It is another object of the present invention to provide a novel method of fabricating a structure of plastic materials that includes the use of molded plastics and structurally reinforcing non-plastic materials.

It is another object of the present invention to provide a method of fabricating a building unit that is simple in operation, inexpensive in construction and maintenance free when in use.

Other objects and a fuller understanding of the invention will be had by referring to the following description and claims of a preferred embodiment thereof, taken in conjunction with the accompanying drawings wherein like reference characters refer to similar parts throughout the several views and in which:

FIG. 2 is a front perspective view of a single section of a mold.

FIG. 3 is a view of four-sided mold prior to assembly for the fabricating process.

FIG. 4 is a cross-sectional view taken horizontally through an assembled mold section with the structurally reinforcing members applied.

FIG. 5 is a cross-sectional view taken along lines 5—5 of FIG. 4, looking in the direction of the arrows.

FIG. 6 is a perspective view of a planter fabricated in accordance with the present method, portions of which are shown in section to illustrate interior configurations.

FIG. 7 is an exploded perspective view of a junction of planters similar to that illustrated in FIG. 6, and partially broken away to illustrate internal configurations.

Figure 1:
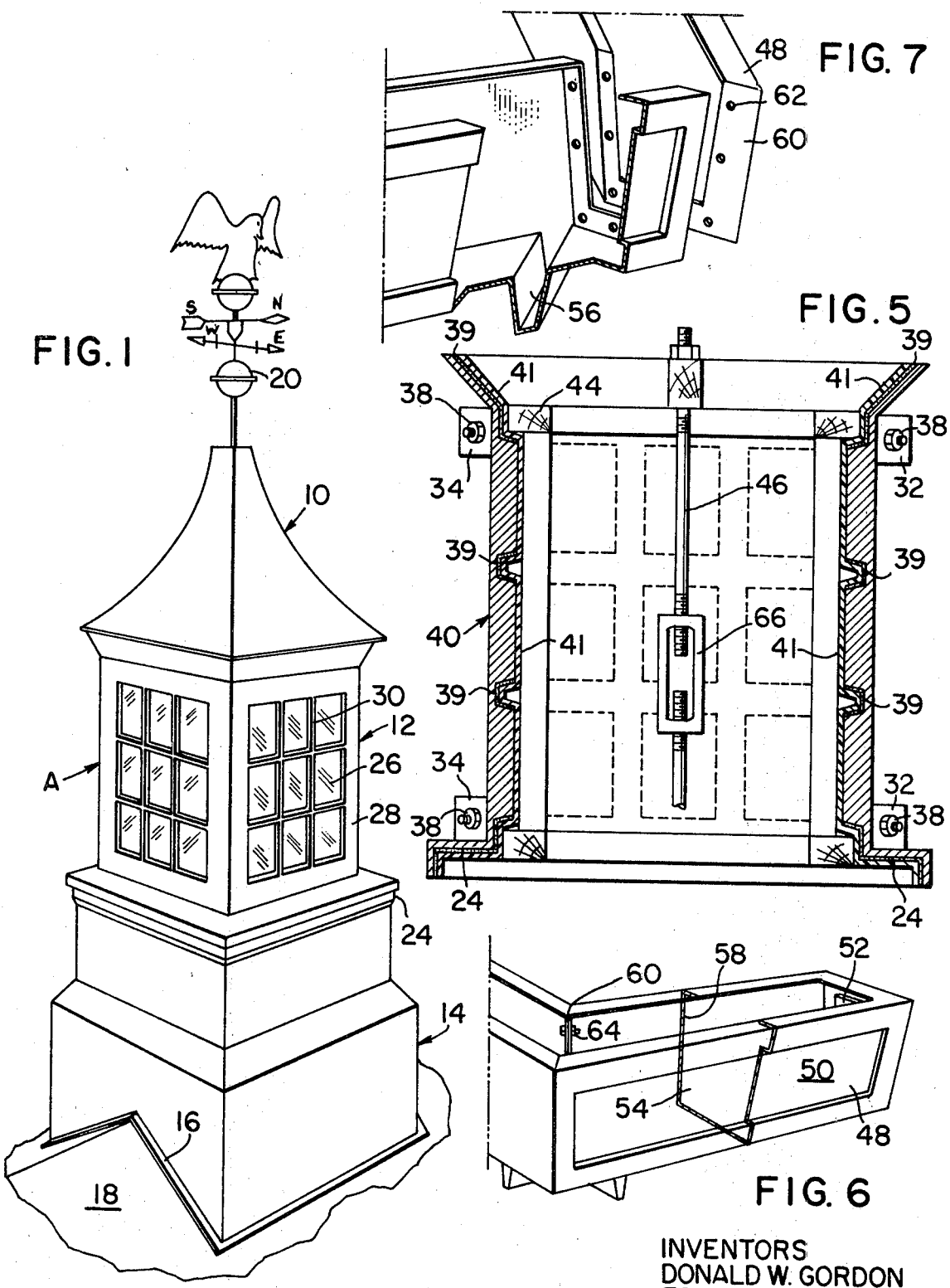
FIG. 1 is a front perspective view of a completed and assembled cupola fabricated in accordance with the teachings of the instant method.

Although specific terms are used in the following description for the sake of clarity, these terms are intended to refer only to the particular structure of our invention selected for illustration in the drawings and are not intended to define or limit the scope of the invention.

Referring now to FIG. 1, we show a fiber glass cupola generally designated A which may be readily fabricated utilizing the present method in three separate connectable units, namely, a cap section 10, an intermediate window simulated area 12 and a base section 14 which can be shaped at the bottom 16 thereof to conform to the ridge configuration of the roof 18 upon which the cupola is to be mounted. A weather vane 20 of known configuration and manufacture affixes to the top of the cap section 10 by utilizing any structurally sound, well-known mounting technique to give the construction an authentic colonial appearance.

As best seen in FIGS. 2 and 3, a plurality of individual mold sections 22 are provided to cooperatively form a multi-sided mold for receiving sprayed applications of plastic materials as hereinafter more fully set forth. Each mold section 22 is fabricated of usual materials to form the desired configuration of the finished product and such shapes as flanges 24, windows 26, wood framing members 28 and window mullions 30 may conveniently be thus provided.

As best seen in FIG. 4, each section 22 of the mold terminates laterally in rearwardly extending flanges 32, 34 bent in angular relation to contact the connecting flanges 34, 32 of the adjacent mold section 22 in face-to-face relation to thereby form a multi-sided mold having the desired cross-sectional configuration. A plurality of bolts 36 position in the mounting holes 35 provided in the flanges 32, 34 to thereby removably join the adjacent flanges 32, 34 of adjoining mold sections 22 through the use of threadedly engaged nuts 38 in well-known manner.

Accordingly, as best illustrated in FIGS. 4 and 5, a mold assembly 40 having the desired cupola section contours formed therein forms an enclosure which serves as a base for the molding operations as hereinafter more fully set forth to produce a finished building unit having the desired contours, color and structural rigidity. When it is desired to provide a simulated window area 12 in the cupola structure A, the individual mold window section 26 must be masked in any well-known manner, such as by employing masking tape (not shown) and care should be exercised to maintain the mold window mullion areas 30 and the mold wood framing member areas 28 clear of masking materials so that an application of surface coloring material may be readily applied to these sections.

After the mold has been assembled as in FIGS. 4 and 5 and after the window simulated area 12 has been properly masked, a pigmented gel-coat material is then sprayed about the entire interior surfaces of the assembled mold sections 40 in a thin, uniform, dense coloring layer 39. At this step, care must be exercised to completely coat all surfaces of the mold to thereby simulate the desired exterior finish. For most purposes, a white gel-coat material is utilized to simulate the appearance of wood painted with an exterior white paint. However, it should be noted that any desired color may be employed such as copper such as when fabricating the cap section 10. The thin sprayed layer 39 of gel-coat coloring material must then be allowed to dry a sufficient length of time as required and necessitated by the actual material employed. We prefer to dry the coloring layer for a period of at least five hours to assure complete stability of the layer before proceeding with additional construction procedures. After expiration of the given period of time, the masking material previously applied to the simulated window area 12 is then removed to thereby expose uncoated portions of the mold surface to directly receive fiber glass plastic material as hereinafter more fully set forth.

Following the gel-coat drying period, the entire interior surfaces 42 of the joined mold sections 22 are then sprayed with a liquid fiber glass material wherein fiber glass strands are suspended within a liquid plastic binder in well-known manner. The surfaces 42 are uniformly coated by the said spraying operation until a fiber glass layer 41 builds up to approximately one-eighth of an inch in thickness to thereby give the structure adequate strength upon curing of the plastic binding materials.

As best seen in FIGS. 4 and 5, horizontal and vertical wooden supports 44 are next applied to the fiber glass coating within the mold construction 40. Sufficient horizontal and vertical wooden support members 44 are utilized to give the unit sections 10, 12 or 14 sufficient rigidity and strength to resist stresses from the elements such as wind or snow and to provide supporting structure to hold the tie rods 46, turnbuckles 66 or other construction which may be required to securely affix the cupola sections together and to connect the cupola base section 14 to the building structure roof 18 in a rigid and permanent construction. It should be noted that the wooden structural supports 44 are applied within the mold assembly prior to the time the sprayed fiber glass material completely cures and hardens. In this manner, the wooden support members 44 imbed and secure to the sprayed fiber glass material during the fiber glass curing period. When the sprayed fiber glass layer completely dries, the wooden supports adhere to the fiber glass layer to form a rigid, sturdy and extremely strong, decorative finished construction.

Upon curing of the fiber glass layer 41 with the structural wooden supports 44 affixed therein, the mold sections 22 may then be readily removed simply by turning the nuts 38 clear of the bolts 36 and then removing the mold sections 22 one at a time. In this manner, a completed cupola section 10, 12, or 14 as formed in the mold then remains as a free standing unit.

Referring now to FIGS. 6 and 7, we show the use of the present method as applied to another form of decorative building unit such as a planter 48. As shown in the drawings, the planter 48 may conveniently be formed to any desired configuration having integrally molded side-walls 50 and end-walls 52 uniterally joined together about the water proof bottom 54. When desired, mounting feet 56 may be integrally formed with the bottom 54 to thereby raise the planter 48 to any desired height above the floor. As best seen in FIG. 6, the planter may be formed to any cross-sectional configuration 58 as may be desired or required simply by adapting the configurations of the mold to the desired shape as hereinbefore set forth. The planter 48 may be conveniently formed by following all of the steps above set forth for the manufacture of a cupola structure with the exception that the step of masking portions of the mold may be eliminated inasmuch as no simulated window construction is required in a planter. The natural strength of cured fiber glass is usually sufficient to hold the weight of normal plantings contained within a planter and accordingly, additional structural wooden supports would not be required in most instances.

As shown in FIG. 7, each planter 48 may terminate at one end thereof in an angular flange 60 which is provided with a plurality of bolt openings 62 to receive the securing bolts 64 therein. In this manner, a complete, self-supporting and readily expandable planter construction may be formed by using the present method. It should be noted that planters thus manufactured may be colored to any desired pigment by employing a suitable gel-coat material. The natural properties of molded fiber glass render the said structures completely waterproof, mildew proof, durable, strong and essentially maintenance-free.

Although we have described our invention with a certain degree of particularity, it is understood that the present disclosure has been made only by way of example and that numerous changes in the details of construction, and the combination and arrangement of parts may be resorted to without departing from the spirit and scope of the invention as hereinafter claimed.

We claim:

1. The method of fabricating a hollow structure of plastic materials having at least four sides, including the steps of (A) fabricating a mold comprising a plurality of at least four separate mold sections, and
   (1) forming the desired structural configurations in the said mold sections;
(B) connecting the said mold sections together in edge to edge juxtaposition to form a multi-sided enclosure;
(C) masking portions of the said mold sections to simulate glass window construction by utilizing mold adhering masking materials and leaving portions of the mold sections unmasked;
(D) spraying the interior surfaces of the said mold with a pigmented material to form a colored surface layer over all the said unmasked areas,
   (1) the said pigmented material being applied in a thin, dense layer and being releasable from the mold surfaces;
(E) allowing the said pigmented material to dry over a required period of time and then removing the said masking materials to thus expose those portions of the mold previously unmasked;
(F) spraying the said colored surfaces and all the previously masked surfaces with a colorless mixture of fiber glass threads suspended within a liquid plastic binder to form a fiber glass layer that is inwardly positioned with respect to the said colored surfaces;
(G) adding horizontal and vertical wooden structural supporting members within the mold enclosure following the said fiber glass spraying operation and prior to curing,
   (1) the said structural supporting members being applied in desired areas directly against the said sprayed fiber glass composition so as to reinforce same,
   (2) the said structural members being adhered firmly to the said fiber glass layer;
(H) allowing the said sprayed fiber glass layer to dry for a period of time sufficient to permit the said liquid binder to completely cure; and
(I) removing the said mold sections from the said combination of pigmented material and fiber glass composition to provide a free standing structure fabricated of plastic material.

2. The method of claim 1 and the further steps of intersecting the said wooden structural members to form a framework.

3. The method of claim 1 and the further steps assembling a plurality of said hollow structures in vertical juxtaposed position and then securing the said structure to the said existing building by employing a vertical, adjustable length rod.

References Cited

UNITED STATES PATENTS

| | | | |
|---|---|---|---|
| 2,046,954 | 7/1936 | La Verne et al. | 264—255 X |
| 2,238,073 | 4/1941 | Patten | 264—255 X |
| 2,861,911 | 11/1958 | Martin et al. | 264—255 X |
| 3,177,279 | 4/1965 | Bilodeau | 264—255 |

ROBERT F. WHITE, Primary Examiner

K. J. HOVET, Assistant Examiner

U.S. Cl. X.R.

52—747; 156—245; 264—219, 255, 309